(12) United States Patent
Stewart et al.

(10) Patent No.: US 11,917,060 B2
(45) Date of Patent: *Feb. 27, 2024

(54) APPARATUS AND METHODS FOR MAPPING USER-ASSOCIATED DATA TO AN IDENTIFIER

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC.

( * ) Notice: Subject to any disclaimer, the term of this patent is extended or adjusted under 35 U.S.C. 154(b) by 0 days.

This patent is subject to a terminal disclaimer.

(21) Appl. No.: 18/114,357

(22) Filed: Feb. 27, 2023

(65) Prior Publication Data

US 2023/0254139 A1    Aug. 10, 2023

Related U.S. Application Data

(63) Continuation of application No. 17/667,628, filed on Feb. 9, 2022, now Pat. No. 11,595,202.

(51) Int. Cl.
*H04L 9/08*        (2006.01)

(52) U.S. Cl.
CPC .................................. *H04L 9/088* (2013.01)

(58) Field of Classification Search
None
See application file for complete search history.

(56) References Cited

U.S. PATENT DOCUMENTS

| | | | | |
|---|---|---|---|---|
| 7,822,631 | B1 * | 10/2010 | Vander Mey | G06Q 10/06395 705/7.41 |
| 8,554,601 | B1 * | 10/2013 | Marsh | G06Q 30/0278 705/7.32 |
| 8,631,501 | B2 * | 1/2014 | Atashband | G07F 17/323 713/168 |
| 9,239,717 | B1 * | 1/2016 | AlSaeed | G06F 8/65 |
| 9,401,904 | B1 * | 7/2016 | Hankins | H04L 63/08 |
| 9,584,987 | B1 * | 2/2017 | Bar-On | H04W 4/08 |
| 9,928,220 | B2 * | 3/2018 | Ritter | G06F 40/117 |
| 10,146,947 | B1 * | 12/2018 | Chapman | H04L 9/3236 |

(Continued)

OTHER PUBLICATIONS

Christine O'Dell, Improving the User Experience in Healthcare through Service Design: Developing a Digital Identity Solution for Patients, Apr. 30, 2020.

(Continued)

*Primary Examiner* — Kambiz Zand
*Assistant Examiner* — Mahabub S Ahmed
(74) *Attorney, Agent, or Firm* — Caldwell Intellectual Property Law

(57) ABSTRACT

An apparatus and method for mapping user-associated data to an identifier. The apparatus includes a processor configured to store a plurality of user identifiers. User identifiers may be determined by way of user or by machine-learning modules or the like. Apparatus receives user-associated data from a user to be stored in a resource data storage system. User-associated data may include a plurality of data sets to be mapped to an identifier. Mapping a data set to an identifier may be user determined or use a machine-learning module. Apparatus is configured to update the immutable sequential listing associated with the data set with the mapped identifier.

20 Claims, 8 Drawing Sheets

(56) References Cited

U.S. PATENT DOCUMENTS

| | | | |
|---|---|---|---|
| 10,826,682 B2 | 11/2020 | Subramaniam | |
| 10,902,341 B1* | 1/2021 | Qureshi | G06Q 10/10 |
| 10,963,658 B1* | 3/2021 | Bloch | G06V 30/186 |
| 11,019,050 B2* | 5/2021 | Li | G06F 21/64 |
| 11,032,081 B1* | 6/2021 | Zaman | H04L 9/3239 |
| 11,095,446 B2* | 8/2021 | Monica | H04L 9/0822 |
| 11,146,594 B2 | 10/2021 | Courtney | |
| 11,176,531 B1* | 11/2021 | Tomkins | G06Q 20/3674 |
| 2001/0043696 A1* | 11/2001 | Pinard | H04Q 3/54533 379/265.01 |
| 2002/0095571 A1* | 7/2002 | Bradee | G06F 21/6236 713/164 |
| 2002/0184217 A1* | 12/2002 | Bisbee | G06F 21/33 707/999.009 |
| 2004/0193909 A1* | 9/2004 | Chang | G06F 21/6236 726/14 |
| 2005/0144229 A1* | 6/2005 | Kulkarni | G06Q 10/10 709/204 |
| 2006/0155581 A1* | 7/2006 | Eisenberger | G06F 16/958 707/999.009 |
| 2007/0150186 A1* | 6/2007 | Ingulsrud | G01C 21/3811 701/431 |
| 2008/0092058 A1* | 4/2008 | Afergan | H04L 67/303 715/745 |
| 2009/0083367 A1* | 3/2009 | Li | G06Q 30/02 709/202 |
| 2009/0133100 A1* | 5/2009 | Buchwald | G06F 21/6218 726/3 |
| 2009/0187440 A1* | 7/2009 | Sreevas | G06Q 10/00 705/75 |
| 2009/0193096 A1* | 7/2009 | Boyer | G06F 16/958 709/217 |
| 2009/0199277 A1* | 8/2009 | Norman | H04L 63/105 726/5 |
| 2009/0235167 A1* | 9/2009 | Boyer | G06Q 10/10 715/708 |
| 2010/0082371 A1* | 4/2010 | Kamp | G16H 10/60 705/2 |
| 2011/0167256 A1* | 7/2011 | Lee | H04L 63/104 713/155 |
| 2011/0313847 A1* | 12/2011 | Cao | G06Q 30/0244 705/14.43 |
| 2012/0102574 A1* | 4/2012 | Schentrup | H04L 63/104 726/28 |
| 2012/0174194 A1* | 7/2012 | Furukawa | G06F 21/604 726/4 |
| 2012/0222015 A1* | 8/2012 | Bennett | G06F 11/3688 717/127 |
| 2012/0271957 A1* | 10/2012 | Carney | H04L 51/56 709/228 |
| 2012/0284637 A1* | 11/2012 | Boyer | G06Q 10/109 715/751 |
| 2014/0157434 A1* | 6/2014 | Graves | H04L 63/102 726/28 |
| 2014/0207518 A1* | 7/2014 | Kannan | G06F 16/958 705/7.29 |
| 2014/0337352 A1* | 11/2014 | Gupta | G06Q 10/107 707/740 |
| 2015/0310424 A1* | 10/2015 | Myers | G06Q 20/401 705/69 |
| 2015/0365404 A1* | 12/2015 | Buer | G06Q 20/341 713/172 |
| 2015/0381580 A1* | 12/2015 | Graham, III | H04L 63/20 713/168 |
| 2016/0070861 A1* | 3/2016 | Bharat | G16H 10/60 705/3 |
| 2016/0180234 A1* | 6/2016 | Siebach | G06N 5/048 705/321 |
| 2016/0342976 A1* | 11/2016 | Davis | G06Q 20/10 |
| 2017/0116677 A1* | 4/2017 | Gray | G06F 16/22 |
| 2017/0236123 A1* | 8/2017 | Ali | G06Q 20/3825 705/75 |
| 2018/0018384 A1* | 1/2018 | Nomura | G06F 16/285 |
| 2018/0025140 A1* | 1/2018 | Edelman | G06Q 20/4016 726/7 |
| 2018/0225660 A1* | 8/2018 | Chapman | G06Q 20/10 |
| 2018/0260429 A1* | 9/2018 | Bhargava | G06F 16/2343 |
| 2018/0262335 A1* | 9/2018 | Bergner | H04L 9/0861 |
| 2018/0287800 A1* | 10/2018 | Chapman | H04L 9/3226 |
| 2018/0308062 A1* | 10/2018 | Quitmeyer | G06Q 10/1053 |
| 2018/0374097 A1* | 12/2018 | Hanna | H04L 63/123 |
| 2019/0108482 A1 | 4/2019 | Vikas et al. | |
| 2019/0122005 A1* | 4/2019 | Larson | G06F 21/604 |
| 2019/0163912 A1* | 5/2019 | Kumar | H04L 9/0891 |
| 2019/0362025 A1* | 11/2019 | Zhou | G06N 20/00 |
| 2020/0076601 A1* | 3/2020 | Tabrizi | H04L 9/0637 |
| 2020/0084046 A1* | 3/2020 | Bessonov | H04L 9/321 |
| 2020/0118094 A1 | 4/2020 | Haldenby et al. | |
| 2020/0162448 A1* | 5/2020 | Dasika Venkata Devi | H04L 67/306 |
| 2020/0204560 A1* | 6/2020 | Yang | H04L 9/3073 |
| 2020/0265154 A1* | 8/2020 | Greven | H04L 63/10 |
| 2020/0272755 A1* | 8/2020 | Soundararajan | G06Q 20/322 |
| 2020/0323316 A1* | 10/2020 | Kothavale | H04W 12/084 |
| 2020/0327546 A1* | 10/2020 | Pennington | G06Q 20/3829 |
| 2020/0327556 A1* | 10/2020 | Wang | H04L 9/3213 |
| 2020/0344233 A1* | 10/2020 | Lai | G06Q 20/4014 |
| 2020/0374105 A1 | 11/2020 | Padmanabhan | |
| 2021/0021423 A1* | 1/2021 | Latorre | G06Q 10/10 |
| 2021/0035098 A1 | 2/2021 | Long et al. | |
| 2021/0036860 A1* | 2/2021 | Ranganathan | H04L 63/102 |
| 2021/0042854 A1* | 2/2021 | Hazy | H04L 63/0421 |
| 2021/0073287 A1* | 3/2021 | Hunter | H04L 63/123 |
| 2021/0073291 A1* | 3/2021 | Hunter | H04L 63/123 |
| 2021/0103984 A1* | 4/2021 | Leonard | G06Q 40/03 |
| 2021/0174360 A1 | 6/2021 | Davies et al. | |
| 2021/0224409 A1* | 7/2021 | Avanes | G06F 16/27 |
| 2021/0243028 A1* | 8/2021 | Song | H04L 9/3228 |
| 2021/0264509 A1 | 8/2021 | Padilha et al. | |
| 2021/0314328 A1 | 10/2021 | Simons | |
| 2021/0326815 A1* | 10/2021 | Brody | G06Q 20/389 |
| 2021/0365584 A1 | 11/2021 | Harris et al. | |
| 2021/0367764 A1* | 11/2021 | Mercuri | H04L 9/0637 |
| 2021/0383308 A1* | 12/2021 | Hanna | G06Q 10/06398 |
| 2021/0390196 A1* | 12/2021 | Lavine | H04L 9/0643 |
| 2021/0409400 A1* | 12/2021 | Palanisamy | H04L 63/0876 |
| 2021/0409409 A1* | 12/2021 | Palanisamy | H04L 63/10 |
| 2022/0021528 A1* | 1/2022 | Dawson, III | H04L 9/0894 |
| 2022/0067194 A1* | 3/2022 | Thakur | G06F 16/21 |
| 2022/0107975 A1* | 4/2022 | Lyske | G06F 16/783 |

OTHER PUBLICATIONS

Leiding et al., Mapping Requirements Specifications into a Formalized Blockchain-Enabled Authentication Protocol for Secured Personal Identity Assurance, Nov. 30, 2017.

* cited by examiner

APPARATUS AND METHODS FOR MAPPING USER-ASSOCIATED DATA TO AN IDENTIFIER

CROSS-REFERENCE TO RELATED APPLICATIONS

This application is a continuation of Nonprovisional application Ser. No. 17/667,628, filed on Feb. 9, 2022, and entitled "APPARATUS AND METHODS FOR MAPPING USER-ASSOCIATED DATA TO AN IDENTIFIER," the entirety of which is incorporated herein by reference.

FIELD OF THE INVENTION

The present invention generally relates to the field of cryptography. In particular, the present invention is directed to apparatus and methods for mapping user-associated data to an identifier.

BACKGROUND

User data may be stored securely using cryptography. There is a need for an apparatus and method to group user data into distinct categories with unique identifiers such that only select categories of data are revealed.

SUMMARY OF THE DISCLOSURE

In an aspect an apparatus for mapping user-associated data to an identifier includes at least a processor and a memory communicatively connected to the processor, the memory containing instructions configuring the at least a processor to store a plurality of user identifiers on an immutable sequential listing, wherein each user identifier of the plurality of user identifiers is associated with a user role, wherein the plurality of user identifiers are autogenerated using a machine learning module as a function of a user role and wherein the machine learning module includes a classifier which classifies user-associated data into user roles from a list of roles and receive, from a user, user-associated data to be stored in a resource data storage system, classify the user-associated data to a user identifier of the plurality of user identifiers, and cryptographically linking user-associated data to the user identifier on the immutable sequential listing.

In another aspect a method for mapping user-associated data to an identifier includes storing, on an immutable sequential listing, a plurality of user identifiers, wherein each user identifier of the plurality of user identifiers is associated with a user role, wherein the plurality of user identifiers are autogenerated using a machine learning module as a function of a user role and wherein the machine learning module includes a classifier which classifies user-associated data into user roles from a list of roles and receiving, from a user, user-associated data to be stored in a resource data storage system, classifying the user-associated data to a user identifier of the plurality of user identifiers and cryptographically linking user-associated data to the user identifier on the immutable sequential listing.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
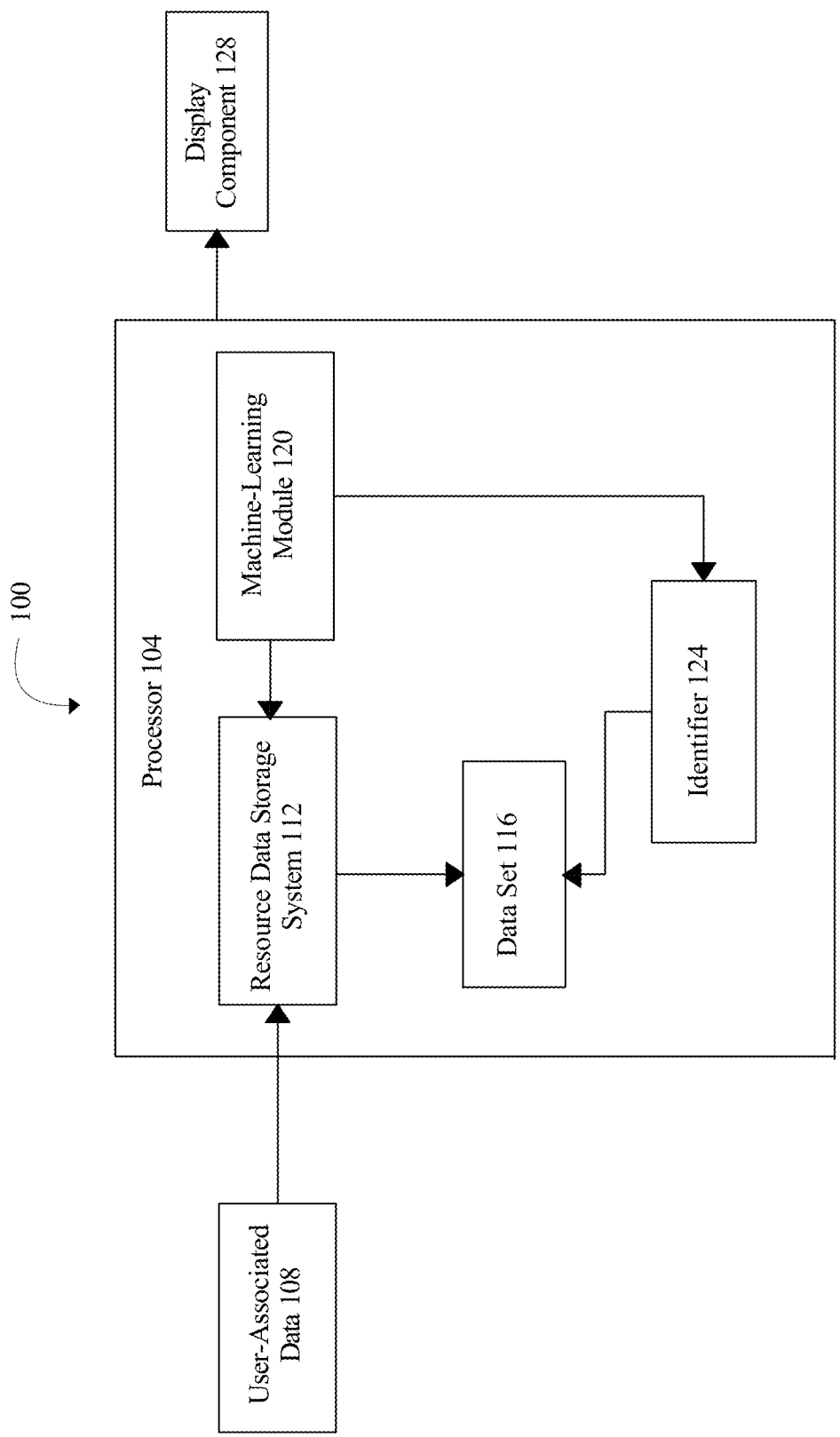
FIG. 1 is a block diagram illustrating an exemplary embodiment of an apparatus for mapping user-associated data to an identifier.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for mapping user-associated data to an identifier.

Aspects of the present disclosure can be used to separate a user's work history into various data sets. Aspects of the present disclosure can also be used to determine an identifier associated with a dataset. In an embodiment, a user may have two distinct work backgrounds. Exemplary embodiments illustrating aspects of the present disclosure are described below in the context of several specific examples.

In an embodiment, methods and apparatus described herein may perform and implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point −A as the point with negative y-coordinates, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments of apparatus and methods described herein may generate, evaluate, and/or utilize digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described in further detail below, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 mapping user-associated data to an identifier 124 is shown. Apparatus includes a processor 104. Processor 104 may include any processor 104 as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of processor 104, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or processor 104.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 is configured to store a plurality of user identifiers (also referred to as "identifiers") on an immutable sequential listing. An "identifier", for the purpose of this disclosure, is a public key or a piece of data based on and/or associated with the public key that associates a user to the block of information (a data set 116). In an embodiment, an identifier 124 may be a role, portion, and/or segment of a job applicant's history. For example, a user may have two or more professional affiliations such as in STEM and patent law, two or more educational affiliations such as teaching and studying, two or more community affiliations such as in healthcare and coaching sports, and the like, among others. User identifiers may be based on each of such user roles. As used herein, a "user role" is a datum describing a position that a user has held. In an embodiment, a position may be job positions, volunteer positions, education degrees, or other positions that define a user's personal and professional life. User identifiers may also be based on different sectors of a user's life, for example, an identifier 124 for education, an identifier 124 for personal life, an identifier 124 for work history, and the like, among others. The identifier 124 may user determined such that the user may enter a set of identifiers on a GUI on a display device. Additionally or alternatively, a user may be prompted to select from a list of predetermined identifiers. Predetermined identifiers may be a list of identifiers that processor 104 may store in a database. Predetermined identifiers may include any assortment of identifiers as discussed above. Predetermined identifiers may be determined by a job posting website or other entities that may use apparatus 100. Entities may also include employers, employees, job applicants, and the like. In an embodiment, a job posting website that may use apparatus 100 may have a place for a user to enter a set of user-associated data 108 (discussed below), and associated identifiers that a user may feel that identifies them. In another embodiment, identifiers may include identifiers that are autogenerated using a machine learning module. Machine learning modules are discussed in further detail below. Apparatus 100 may be configured to determine the user identifiers using a classifier. In an embodiment, apparatus 100 may classify user-associated data into user roles from a list of roles and generate a user identifier based on each role. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. In an embodiment, processer may use a data classifier. In an embodiment, processor 104 may classify user identifiers into categories associated with user roles, jobs, education level, types of certifications, experience related to different degrees, and the like. A classifier may be configured to output at least a datum that labels or otherwise identifies a set of data that are clustered together, found to be close under a distance metric as described below, or the like. Processor 104 and/or another device may generate a classifier using a classification algorithm, defined as a processes whereby a processor 104 derives a classifier from training data. In an embodiment, training data may be made up of a plurality of training examples that each include examples of data to be inputted into the machine-learning module 120, such as work history, professional affiliation and the like, and examples of data to be output therefrom, such as identifiers associated with the given work history, professional affiliation, etc. Training data may be implemented in any manner discussed below. Training data may be obtained from and/or in the form of categorization. In an embodiment, training data may include an assortment of work history, wherein the work history may include jobs related to patent law and jobs related to mechanical engineering. In this instance, classifier may categorize the work history into different categories. The different classifications may be the user identifiers. Machine learning module may output identifiers such as patent law and mechanical engineering as identifiers relating to the previous example. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Classification is discussed in further detail below.

With continued reference to FIG. 1, processor 104 is configured to receive a set of user-associated data 108 to be stored in a resource data storage system 112. As used herein, "user-associated data" refers to information relating to the user's background/history. A user may include job applicants, employees, employers, and the like. User-associated data 108 may include a written or video resume. User-associated data 108 may include data on a user's work history that may be described on a resume. As used in this disclosure, a "resume" is an item of media that includes content representative or communicative of the jobseeker. A resume may include personally identifiable information about the job seeker such as the jobseeker's name, address, phone number, etc. A resume may include information about the jobseeker's employment history, education, skills, etc. A resume may be a video resume. A "video resume", as used in this disclosure, is a resume that represents the jobseeker directly, in person, by video. A video resume may be any video in visual and/or audio form to provide a recording promoting a jobseeker. Application data may include visual content such that user-specific historical record may include visual content. Visual content may be in the form of written content or a video. Video may include visual content that is non-verbal. For example and without limitation, video may include change in intonation and/or stress in speaker's voice, expression of emotion, interjection, and the like. As used herein, a "resource data storage system" is a database stored on processor 104 or remotely that contains information on a user. In an embodiment, information may comprise of user-associated data 108, other job information, education information, or the like. Resource data storage system 112 may be stored on an immutable sequential listing 200, for instance and without limitation as discussed in further detail in FIG. 2. Immutable sequential listing 200 may comprise of blocks containing entries of data. For example, a job board website may store candidate information such as but not limited to age, name, gender, title at past or current position, field of work, experience, events, career milestones, educational attainments, etc. Entries of data may also comprise of records of transactions, such as Bitcoin transactions. Additionally, entries of data may comprise of files, such as JPEGs, documents, spreadsheets, videos, pictures, etc. Blocks of the immutable sequential listing 200 may be hashed and encoded into a Merkle tree. In an embodiment, each block includes the cryptographic hash of the prior block, linking the blocks and creating a chain. The top of the Merkle tree may comprise a Merkle root that may comprise a cryptographic accumulator 300. The immutable sequential listing 200 includes a cryptographic accumulator 300, discussed in further detail in FIG. 3. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set.

Still referring to FIG. 1, processor 104 may be configured to split the user-associated data 108 into separate data sets. The individual data set 116 may be stored in an immutable sequential listing such that each data set 116 may be stored in a block of the immutable sequential listing. User-associated data 108 may be split into categories relating to specific roles, jobs, identities, or the like. In an embodiment, a user with a bartending and law background may have two data sets, one associated with their law background, and one associated with their bartending background. This process may be user driven, such that the user defines their own data sets, or processor 104 may use a machine-learning module 120, discussed in FIG. 4. Machine-learning module 120 may use a classifier to split the user-associated data 108. In an embodiment, processer may use a data classifier. As used in this disclosure, a "data classifier" is an identifying indicia relating to the user-associated data 108, for example, education level, traits, skills, jobs. In an embodiment, processor 104 may classify user-associated data 108 into categories associated with jobs, education level, types of certifications, experience related to different degrees, and the like. A classifier may be configured to output at least a datum that labels or otherwise identifies a set of data that are clustered together, found to be close under a distance metric as described below, or the like. Processor 104 and/or another device may generate a classifier using a classification algorithm, defined as a processes whereby a processor 104 derives a classifier from training data. In an embodiment, training data may be made up of a plurality of training examples that each include examples of data to be inputted into the machine-learning module 120, such as experience associated with types of jobs, jobs associated with different degrees (like a mechanical engineering job for a degree in mechanical engineering), etc., and examples of data to be output therefrom, such as data sets that include job history associated with different degrees, experience history associated with a job, etc. Training data may be implemented in any manner discussed below. Training data may be obtained from and/or in the form of previous data set 116 categorization. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Continuing to refer to FIG. 1, processor 104 is configured classify an identifier 124 of a plurality of user identifiers to the user-associated data 108. User-associated data 108 may include a plurality of data sets, each of which may be associated with an identifier 124. Each identifier 124 of the plurality of identifiers may be linked to a data set 116 of a plurality of data sets. In an embodiment, an identifier 124 may be a role, portion, and/or segment of a job applicant's history. For example, if a user has been a doctor and a lawyer, the user-associated data 108 relevant to their career as a doctor may be assigned to one identifier, and the user-associated data 108 relevant to their career as a lawyer may be assigned to a second identifier. In another embodiment, following the previous example, a user with a law background and a bartending background may have two distinct data sets and two distinct identifiers associated with the two backgrounds. In another embodiment, a user may have their valid driver's license stored in the same data set 116 as their truck driver background. The same user may have a separate data set 116 with a different identifier that is associated with their volunteering at local shelters. The data set 116 may be configured to be mapped to at least one identifier 124. In the example above, some data in the data set 116 is mapped to two different identifiers. A user may have a plurality of backgrounds relating to work experience, jobs, education, and the like. In an embodiment, selection of identifiers may be user driven. For example, a user may sort user-associated data 108 into various identities. This may be accomplished by user interaction with a graphic user interface (GUI) on a display component 136, discussed in further detail below. An identifier 124 may be mapped to a data set using a machine-learning module 120. Similar to splitting the user-associated data 108 into data sets and determining user identifiers, mapping an identifier 124 to a data set 116 may involve a classifier. A classifier may be used to identify different identities of a user, such as a job applicant. Data sets may be sorted into categories as discussed above. Classifier may output an identifier 124 relating to the categories. In an embodiment, identifier 124 may be public role specific. For example, an identifier 124 may be truck driver, and the data set 116 associated with the identifier 124 may include job history of trucking and licenses associated with being a truck driver. In another embodiment, an identifier 124 may be a user's education level. For example, a user may have an identifier 124 based on their bachelor's degree in mechanical engineering, and a data set 116 associated with their mechanical engineering background. The same user may have another identifier 124 based on their Master's of Business Administration (MBA) and a data set 116 associated with their MBA such as work history and roles related to their MBA. An identifier 124 and data set 116 may be mapped together by a category classifier pair, wherein the categories may be related to a certain identifier. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. A cryptographic accumulator (FIG. 3) may be used to generate a transaction linking the user-associated data to the user identifier. In an embodiment, a cryptographic accumulator may use a Merkle tree or a hash tree linking different data sets to a single identifier or linking one identifier to a plurality of data sets, created from the user-associated data.

Still referring to FIG. 1, processor 104 may validate user identity. User's identity may be verified through various means including but not limited to a cryptographic commitment, verifying location using IP address, using two-factor authentication, etc. In the case of a commitment, user's identity may be verified by opening the commitment. For example, user may be requested to enter a user-specific secret as a commitment. A user-specific secret, as used herein, is any data that is only known or possessed by a user. In an embodiment, a user-specific secret may include personal identification number (PIN) as a commitment. a password, a personal identification number, a mnemonic device, etc. Additionally or alternatively, user-specific secret may be a biometric datum or a datum and/or key generated therefrom. Additional information on biometric datum is illustrated in U.S. patent application Ser. No. 17/486,461 entitled "SYSTEMS AND METHODS FOR SCORE GENERATION FOR APPLICANT TRACKING" filed on Sep. 27, 2021, the entirety of which is incorporated herein by reference. The commitment may be opened and verified against the user-specific secret to confirm that the secret is correct. In another embodiment, commitment may be hashed and compared to a hash of the user-specific secret. If the two hashes are identical, user identity may be verified. In another embodiment, a commitment may be verified by determining that a cryptographic accumulator contains the user-specific secret. User identity may additionally be verified using a location-based IP address. In an embodiment, a user applying to jobs in Los Angeles, California typically would not have an IP address based in Oslo, Norway. User identity may additionally be verified using two-factor authentication. In an embodiment, the user may get a verification request on another processor 104 known to be owned by the user. User verification may be completed using a one or a combination of verification methods listed above. Proof of possession may comprise of a private key, and/or a digital signature. Proof of possession may be verified by encrypting with a private key of an identifier 124 and decrypting with the public key of the identifier 124. If the data matches, the user may be verified as possessing the identifier 124. In an embodiment, proof of identity may include a secure proof of possession of at least a portion of the data. Additional information on user validation is illustrated in U.S. patent application Ser. No. 17/486,461, filed on Sep. 27, 2021 entitled "SYSTEMS AND METHODS FOR SCORE GENERATION FOR APPLICANT TRACKING," the entirety of which is incorporated herein by reference.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Continuing to reference FIG. 1, processor 104 may validate data sets using cryptographic systems. In an embodiment, processor 104 may use a third-party validator device. Third-party validator device may include one or more remote devices communicating with data security management device operated by a third-party. At least a third-party validator device may include any device or set of devices suitable for use as data security management device. At least a third-party validator device may include modules such as biometric reader, cryptographic module, and/or key retrieval module. At least a third-party validator device may be operated by a user. A user may include a third party who may have a relationship with a requestor and who may validate information pertaining to requestor. For example, this may include an individual who may have worked with requestor in the past, or who may currently work with requestor. This may also include peers such as a mentor that requestor may have interned for. Third-party may be an authorized person from an organization requestor volunteered at or may be a hiring manager or human resources manager who kept employment records pertaining to requestor. A third-party may validate information pertaining to requestor such as employment history, requestor demographics, education, skills, social activities, and/or academic details. In an embodiment, a third party may include social media sources instead of a person who is able to verify information pertaining to a requestor. For example, a third party may include a processor 104 that may engage in web crawling to confirm requestor activity in social engagements such as by checking websites of organizations and clubs where requestor may engage in social engagements. For example, a processor 104 may verify if a requestor was a volunteer at requestor's church by web crawling to requestor's church website and examining the website to see if requestor may be listed as a volunteer. As a non-limiting example, data may be sourced under three categories, such as a candidates employment history, pre-employment screening, academic details and social engagement activities. different types of techniques have been employed to collect data based on entity and validation. Web crawling may include checking related websites and other sources of information that may indicate clues in reference to requestor social engagements, for example. Additional information on data set validation is illustrated in U.S. patent application Ser. No. 16/698,182 entitled "SYSTEMS AND METHODS FOR BIOMETRIC KEY GENERATION IN DATA ACCESS CONTROL, DATA VERIFICATION, AND PATH SELECTION IN BLOCK CHAIN-LINKED WORKFORCE DATA MANAGEMENT" filed on Nov. 27, 2019.

Continuing to refer to FIG. 1, processor 104 is configured to update, as a function of mapping, the data set 116 stored on an immutable sequential listing with an identifier 124. Once a data set 116 and an identifier 124 are mapped together, processor 104 may associate identifier 124 with data set 116 in the resource data storage system 112. In an embodiment, processor 104 may add another block to the immutable sequential listing associated with the data set 116 to reflect the newly mapped user identifier 124. In an embodiment, processor 104 may cryptographically insert a hash chain of the user identifier 124. User may sign the data set 116 and user identifier 124 with a digital signature to associate the data set 116 and user identifier 124 with themselves. In an embodiment, a digital signature may include a user-specific signature such as a PIN or password. In some instances, user may determine that the associated identifier 124 with a given data set 116 is incorrect. In such cases, user may select a new identifier 124 to map to the data set 116. Machine-learning module 120 may use this user feedback loop as training data to properly identify identifiers in the future. As used herein, a "feedback loop" uses outputs as inputs. In an embodiment, machine-learning module 120 may use a feedback loop by using user input as part of the training data, thus improving accuracy of outputs.

Still referring to FIG. 1, processor 104 may include a display component 136. In one or more embodiments, display component 136 may be communicatively connected to processor 104. Display component 136 may be remote to processor 104 or integrated into processor 104. Communication between processor 104 and display component 136 may be wired or wireless. In one or more embodiments, display component 136 may be configured to display employment datum 120, audiovisual datum, database information, video resume 128, and the like. Display component 136 may include a graphic user interface (GUI) that a user 108 may use to navigate through presented data or information by processor 104. GUI is configured to display the video resume 128. In one or more embodiments, a GUI may include a plurality of lines, images, symbols, and the like to show information and/or data. In non-limiting embodiments, display component 136 may include a smartphone, tablet, laptop, desktop, monitor, tablet, touchscreen, head-up display (HUD), and the like. In one or more embodiments, display component 136 may include a screen such as a liquid crystal display (LCD) various other types of displays or monitors. In one or more embodiments, user 108 may view information and/or data displayed on display component 136 in real time. In one or more embodiments, display component 136 may be configured to display received or determined information, which may be toggled through using, for example, an input device of display component 136 or processor 104. Display component 136 may include electronic components utilized to display image data or information, such as a video, GUI, photo, and the like.

Figure 2:
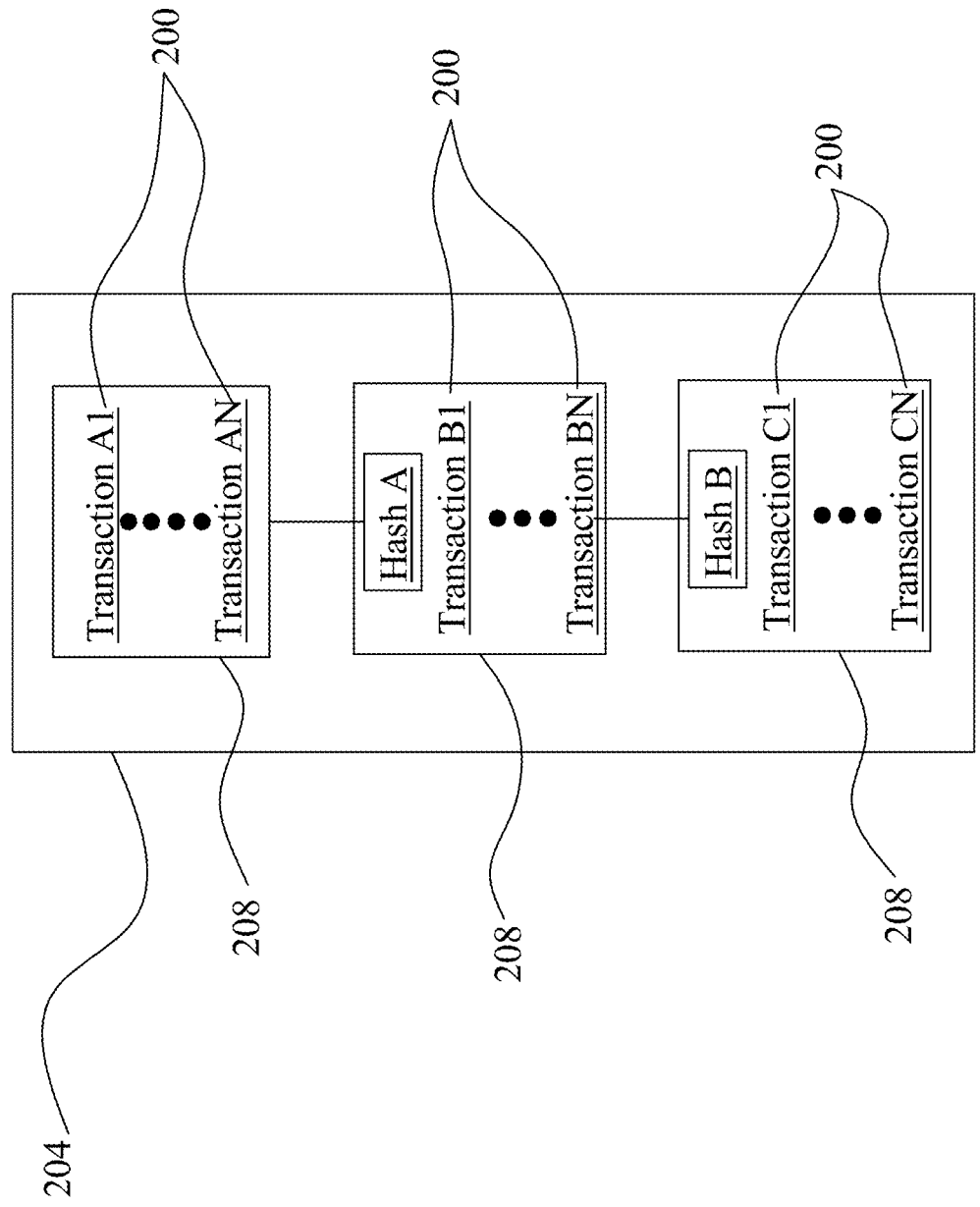
FIG. 2 is a block diagram illustrating an exemplary embodiment of an immutable sequential listing.

Referring now to FIG. 2, an exemplary embodiment of an immutable sequential listing 200 is illustrated. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a processor 104, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any processor 104 may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continu-ing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block chain protocols that permit a person or computer forming a at least a posted content to insert additional data in the immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
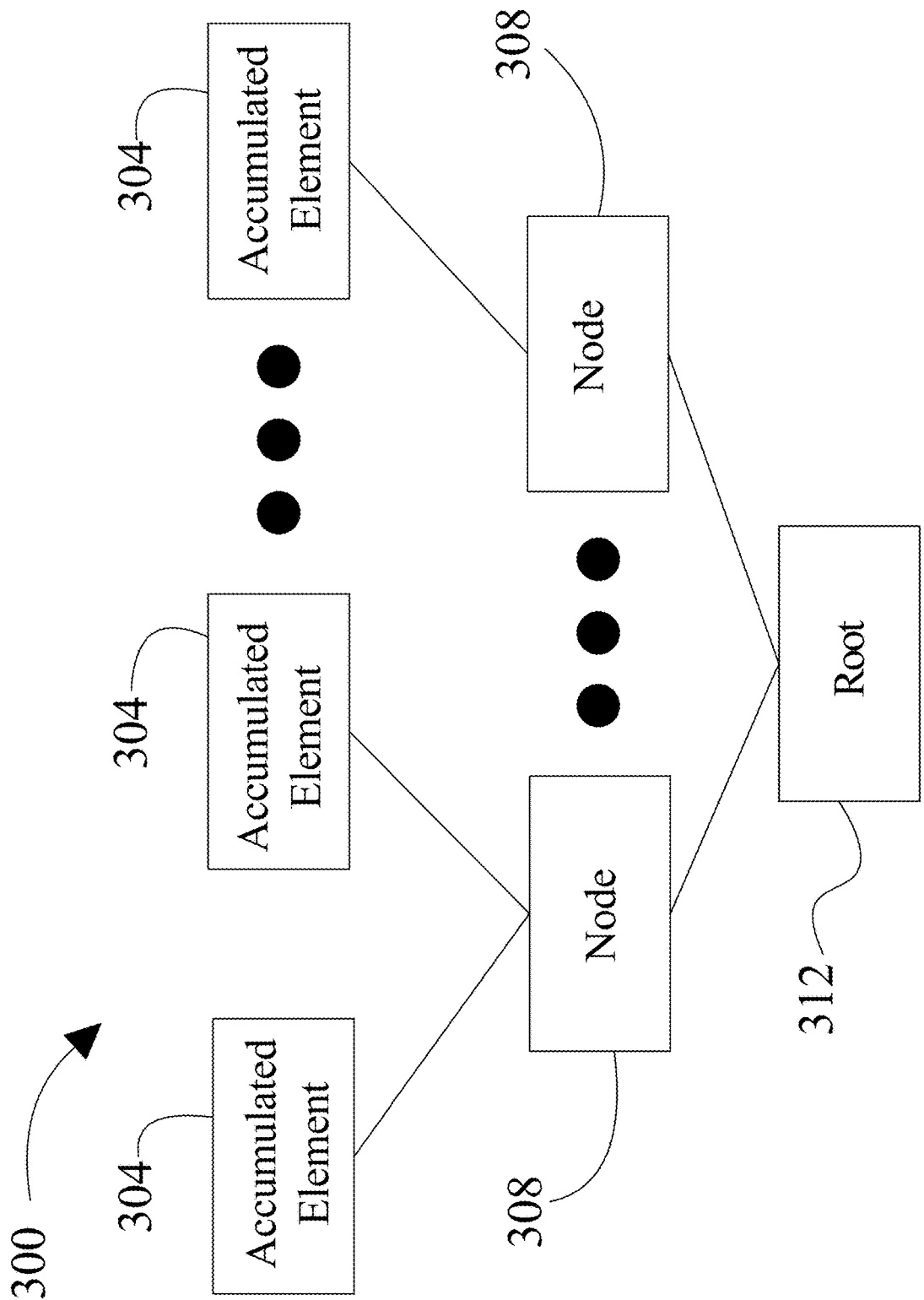
FIG. 3 is a block diagram illustrating an exemplary embodiment of a cryptographic accumulator.

Turning now to FIG. 3, an exemplary embodiment of a cryptographic accumulator 300 is illustrated. Cryptographic accumulator 300 has a plurality of accumulated elements 304, each accumulated element 304 generated from a lot of the plurality of data lots. Accumulated elements 304 are create using an encryption process, defined for this purpose as a process that renders the lots of data unintelligible from the accumulated elements 304; this may be a one-way process such as a cryptographic hashing process and/or a reversible process such as encryption. Cryptographic accumulator 300 further includes structures and/or processes for conversion of accumulated elements 304 to root 312 element. For instance, and as illustrated for exemplary purposes in FIG. 3, cryptographic accumulator 300 may be implemented as a Merkle tree and/or hash tree, in which each accumulated element 304 created by cryptographically hashing a lot of data. Two or more accumulated elements 304 may be hashed together in a further cryptographic hashing process to produce a node 308 element; a plurality of node 308 elements may be hashed together to form parent nodes 308, and ultimately a set of nodes 308 may be combined and cryptographically hashed to form root 312. Contents of root 312 may thus be determined by contents of nodes 308 used to generate root 312, and consequently by contents of accumulated elements 304, which are determined by contents of lots used to generate accumulated elements 304. As a result of collision resistance and avalanche effects of hashing algorithms, any change in any lot, accumulated element 304, and/or node 308 is virtually certain to cause a change in root 312; thus, it may be computationally infeasible to modify any element of Merkle and/or hash tree without the modification being detectable as generating a different root 312. In an embodiment, any accumulated element 304 and/or all intervening nodes 308 between accumulated element 304 and root 312 may be made available without revealing anything about a lot of data used to generate accumulated element 304; lot of data may be kept secret and/or demonstrated with a secure proof as described below, preventing any unauthorized party from acquiring data in lot.

Alternatively or additionally, and still referring to FIG. 3, cryptographic accumulator 300 may include a "vector commitment" which may act as an accumulator in which an order of elements in set is preserved in its root 312 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 300 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 4:
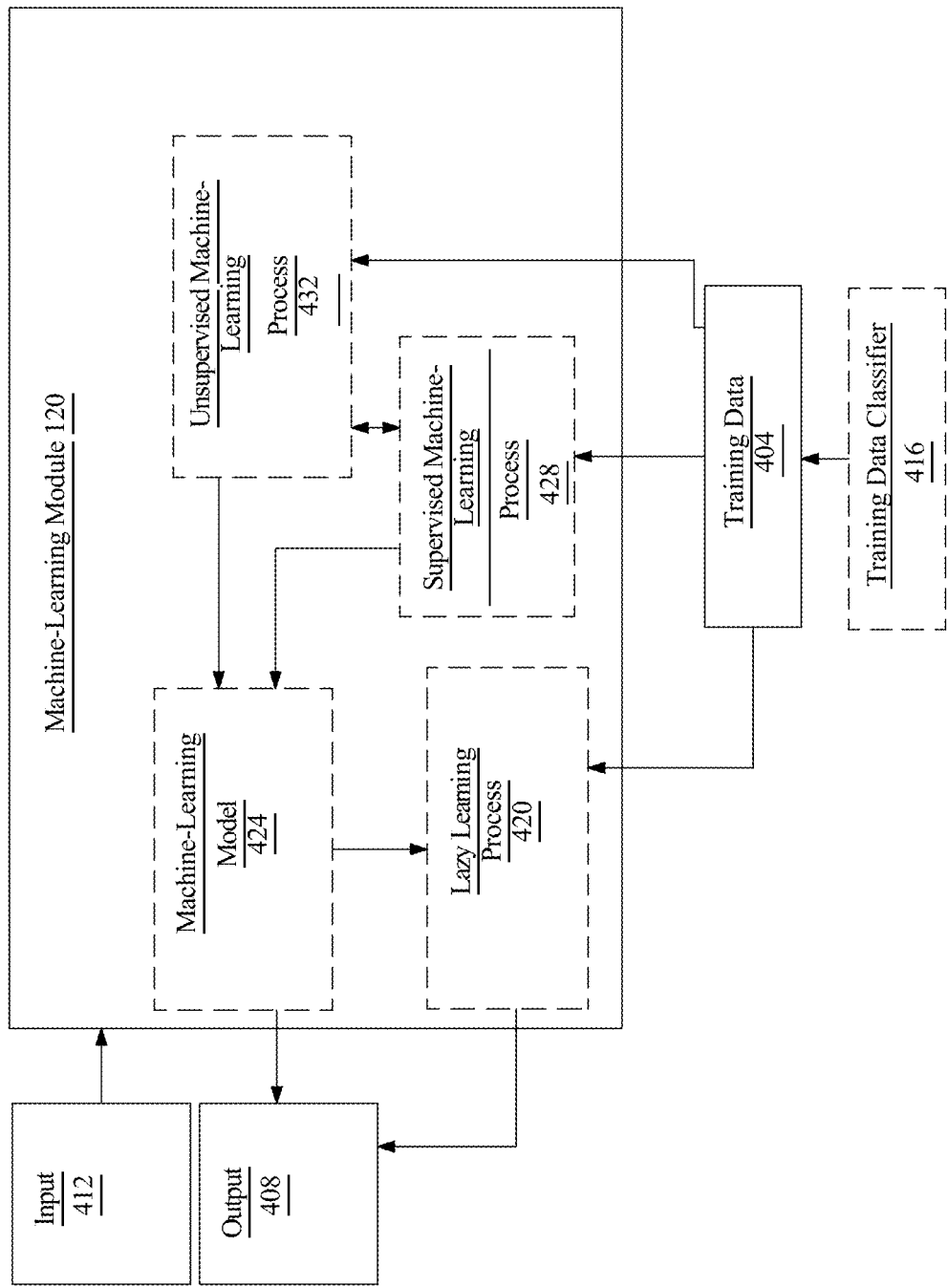
FIG. 4 is a block diagram of exemplary machine-learning processes.

Referring now to FIG. 4, an exemplary embodiment of a machine-learning module 120 that may perform one or more machine-learning processes as described in this disclosure is illustrated. Machine-learning module 120 may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a processor 104/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 120 may correlate any input data as described in this disclosure to any output data as described in this disclosure. As a non-limiting illustrative inputs may include subject-specific data and outputs may include description-specific data.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 120 may generate a classifier using a classification algorithm, defined as a processes whereby a processor 104 and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to according to fields of job description for instance, title, role, organization, requisite experience, requisite credentials, and the like.

Still referring to FIG. 4, machine-learning module 120 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 120 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
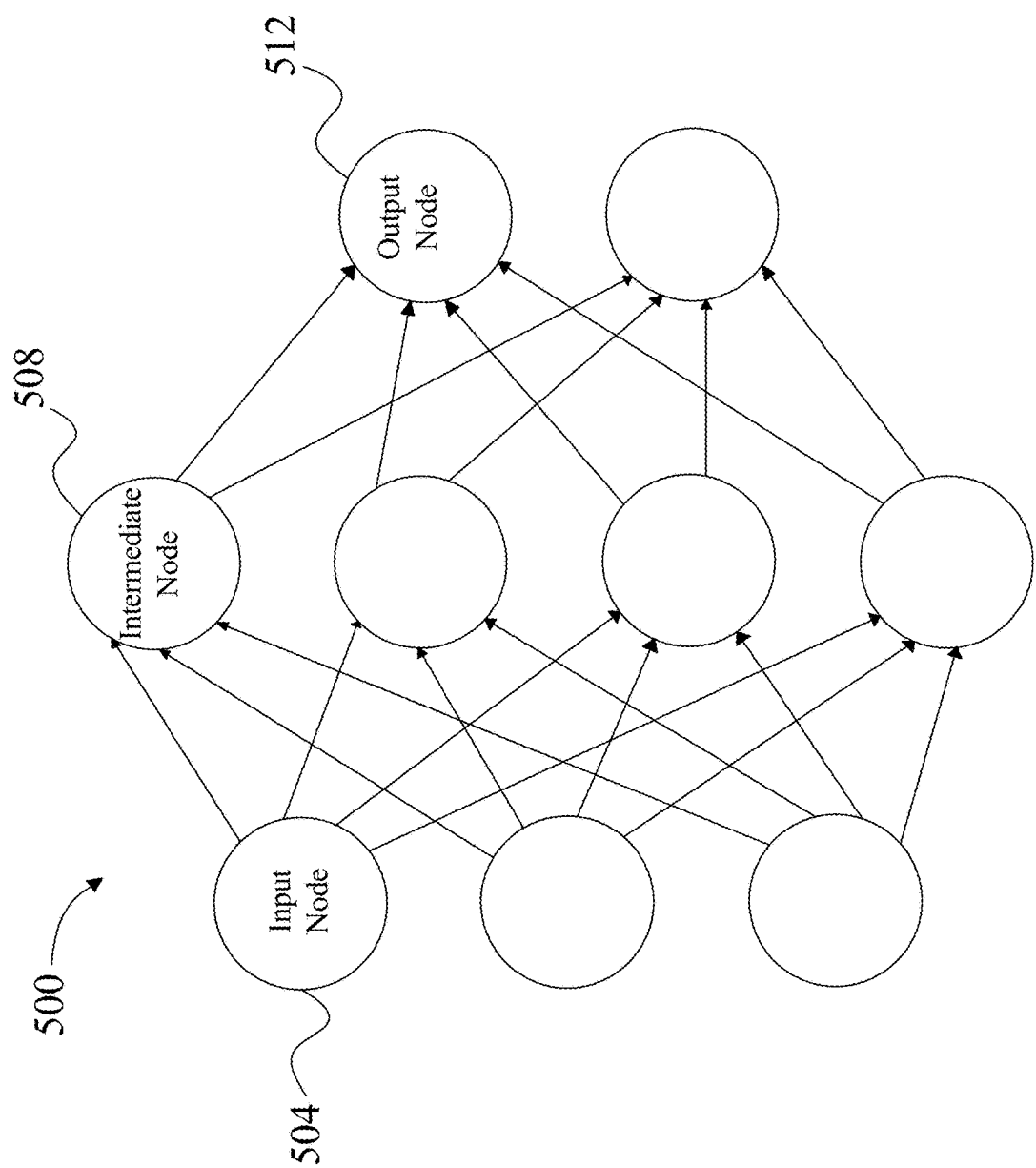
FIG. 5 illustrates an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 6:
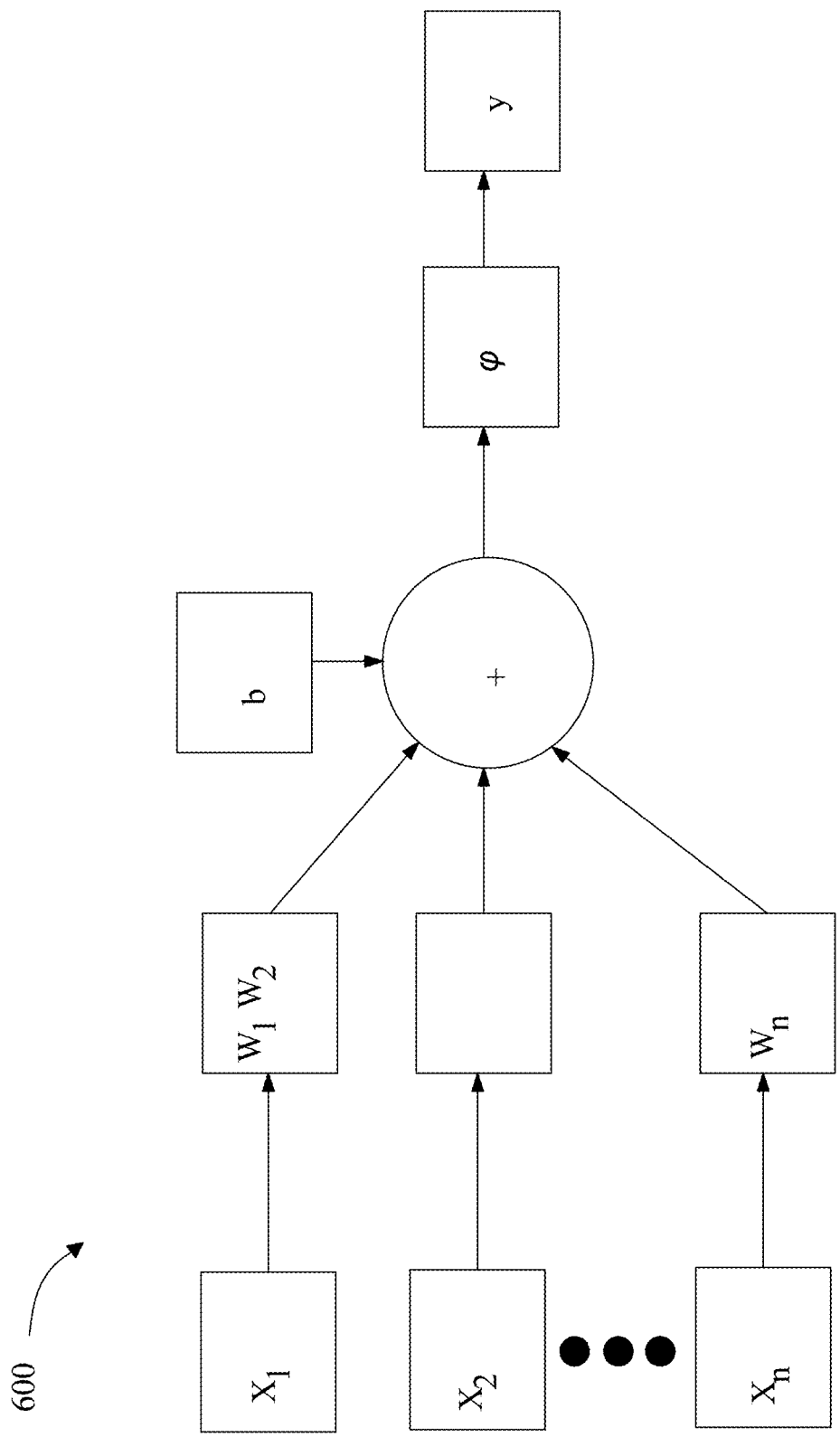
FIG. 6 is a block diagram of an exemplary node.

Referring now to FIG. 6, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
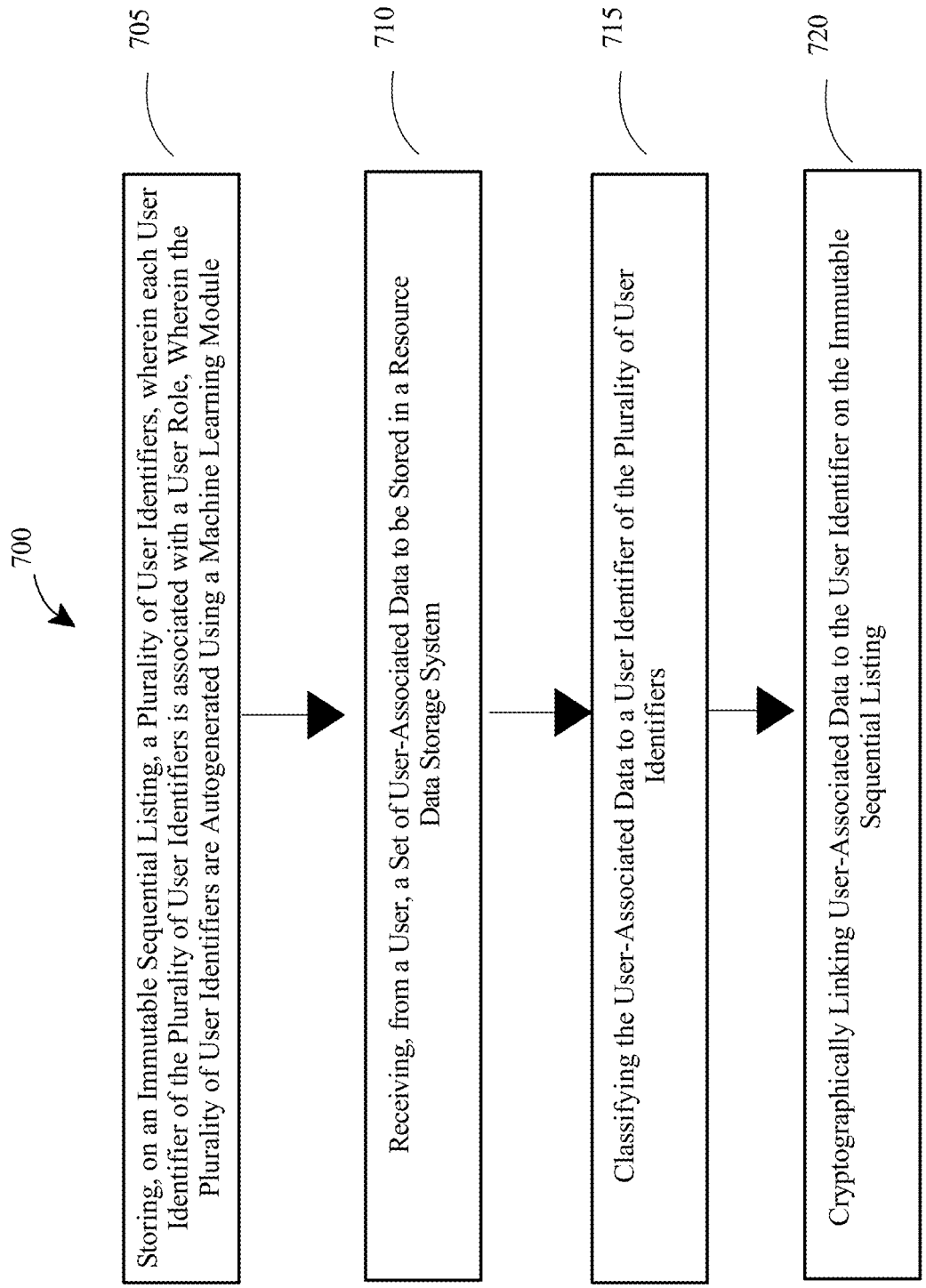
FIG. 7 is a flow diagram illustrating an exemplary embodiment of a method for mapping user-associated data to an identifier.

Referring now to FIG. 7, an exemplary embodiment of method 700 for mapping user-associated data 108 to an identifier 124. Step 705 of method 700 includes storing, by immutable sequential, listing, a plurality of user identifiers. User identifiers may be user identifier 124 or may be determined and/or autogenerated by a machine-learning module 120. Step 710 of method 700 includes, receiving, from a user, a set of user-associated data 108 to be stored in a resource data storage system 112, wherein user-associated data may include a plurality of data sets. User-associated data 108 may contain a user's whole work history that may be categorized into different data sets. User-associated data may include a video resume. In an embodiment, a user's work history may be defined by the type of work done (i.e. law, engineering, research, etc.). In another embodiment, a machine learning module may utilize a classifier to split the user-associated data.

Step 715 of method 700 includes mapping, by processor 104, an identifier 124 of a plurality of user identifiers to a data set 116 of a plurality of data sets. Mapping may be done using user input, machine-learning, or the like. In an embodiment, mapping of an identifier 124 may include categorizing and assigning a category name to a data set 116. Step 720 of method 700 includes updating, as a function of mapping, the data set 116 stored on an immutable sequential listing with an identifier 124. The immutable sequential listing associated with the data set 116 may contain a new block containing the identifier 124. A user may digitally sign the data set 116 and identifier 124 such that the new block is associated with the user.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
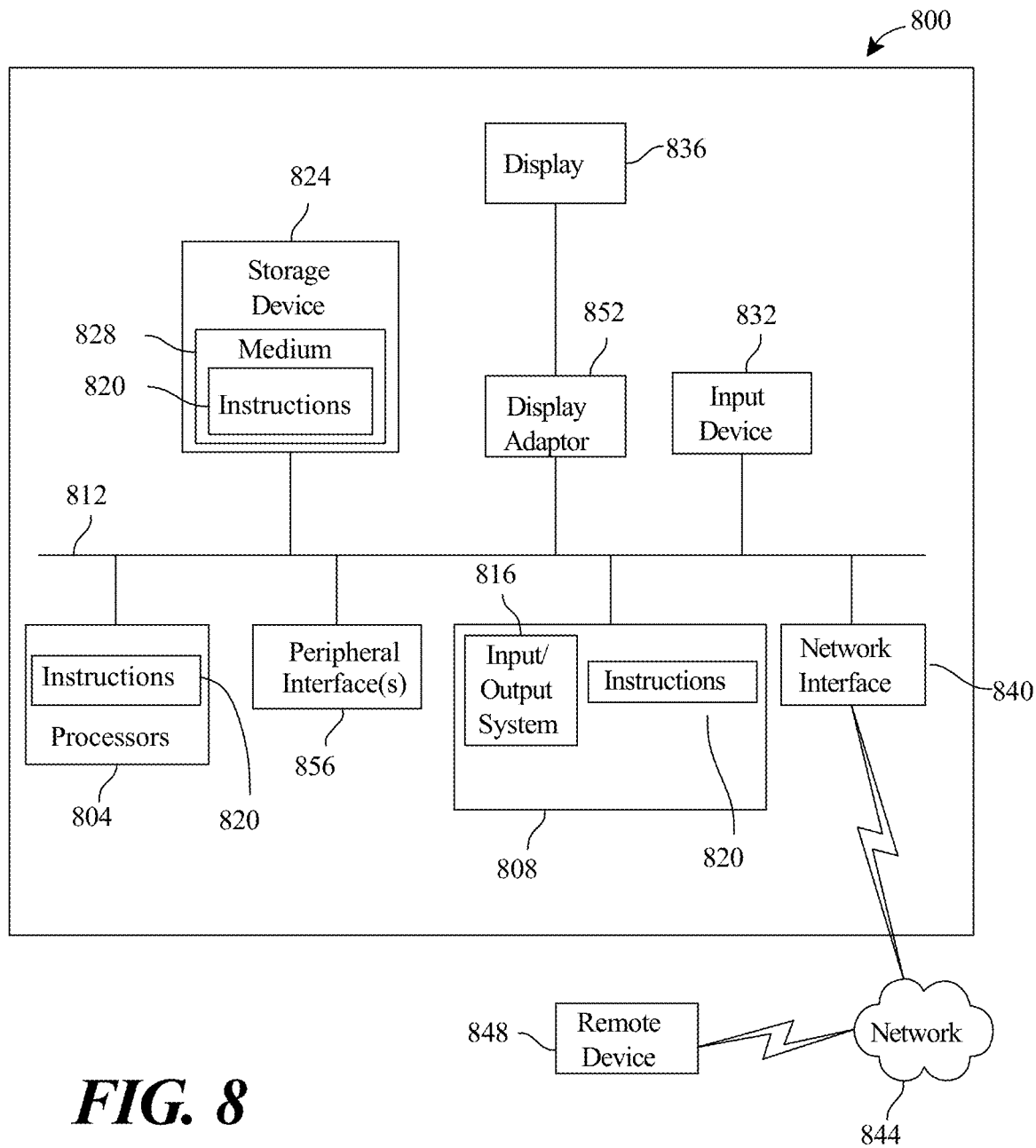
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 882 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 882 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 886. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for mapping user-associated data to an identifier, the apparatus comprising:
   at least a processor; and
   a memory communicatively connected to the processor, the memory containing instructions configuring the at least a processor to:
   store a plurality of user identifiers on an immutable sequential listing, wherein each user identifier of the plurality of user identifiers is associated with a user role, wherein the plurality of user identifiers are autogenerated using a machine learning module as a function of a user role, wherein the machine learning module comprises a classifier configured to classify user-associated data into user roles from a list of roles;
   receive, from a user, user-associated data to be stored in a resource data storage system;
   classify the user-associated data to a user identifier of the plurality of user identifiers; and
   cryptographically link user-associated data to the user identifier on the immutable sequential listing.

2. The apparatus of claim 1, wherein the user role comprises a datum describing a position that the user has held.

3. The apparatus of claim 1, wherein the user-associated data comprises a video resume.

4. The apparatus of claim 1, wherein the plurality of user identifiers further comprises a plurality of user determined identifiers.

5. The apparatus of claim 1, wherein each user identifier of the plurality of user identifiers is linked to a data set of a plurality of data sets.

6. The apparatus of claim 1, further configured to split the user-associated data into a plurality of data sets.

7. The apparatus of claim 2, wherein the datum describing the position that the user has held comprises an education degree.

8. The apparatus of claim 1, wherein the at least a processor is further configured to validate the user-associated data using cryptography.

9. The apparatus of claim 1, wherein the at least a processor is further configured to split using the classifier, the user-associated data into separate data sets.

10. The apparatus of claim 1, wherein the at least a processor is further configured to use a cryptographic accumulator to generate a transaction linking the user-associated data to the user identifier.

11. A method for mapping user-associated data to an identifier, the method comprising:
    storing on an immutable sequential listing, using at least a processor, a plurality of user identifiers, wherein each user identifier of the plurality of user identifiers is associated with a user role, wherein the plurality of user identifiers are autogenerated using a machine learning module and wherein the machine learning module comprises a classifier which classifies user-associated data into user roles from a list of roles;
    receiving, using the at least a processor, user-associated data from a user to be stored in a resource data storage system;
    classifying, using the at least a processor, the user-associated data to a user identifier of the plurality of user identifiers; and
    cryptographically linking, using the at least a processor, user-associated data to the user identifier on the immutable sequential listing.

12. The method of claim 11, wherein the user roles comprise a datum describing a position that a user has held.

13. The method of claim 11, wherein the user-associated data comprises a video resume.

14. The method of claim 11, wherein the plurality of user identifiers further comprises a plurality of user determined identifiers.

15. The method of claim 11, further comprising linking, using the at least a processor, each user identifier of the plurality of user identifiers to a data set of a plurality of data sets.

16. The method of claim 11, further comprises splitting, using the at least a processor, the user-associated data into a plurality of data sets.

17. The method of claim 12, wherein the datum describing the position that a user has held comprises an education degree.

18. The method of claim 11, further comprising validating, using the at least a processor, the user-associated data using cryptography.

19. The method of claim 16, further comprising utilizing, by the at least a processor, the at least a classifier to split the user-associated data into separate data sets.

20. The method of claim 11, further comprising utilizing, by the at least a processor, a cryptographic accumulator to generate a transaction linking the user-associated data to the user identifier.

* * * * *